US012620733B2

(12) United States Patent
Lybrand

(10) Patent No.: US 12,620,733 B2
(45) Date of Patent: May 5, 2026

(54) INSULATING PIERCING CONTACT WITH WIRE RETENTION FEATURE

(71) Applicant: KYOCERA AVX Components Corporation, Fountain Inn, SC (US)

(72) Inventor: Brent Lybrand, Fountain Inn, SC (US)

(73) Assignee: KYOCERA AVX COMPONENTS CORPORATION, Fountain Inn, SC (US)

( * ) Notice: Subject to any disclaimer, the term of this patent is extended or adjusted under 35 U.S.C. 154(b) by 294 days.

(21) Appl. No.: 18/451,948

(22) Filed: Aug. 18, 2023

(65) Prior Publication Data

US 2024/0079805 A1 Mar. 7, 2024

Related U.S. Application Data

(60) Provisional application No. 63/401,902, filed on Aug. 29, 2022.

(51) Int. Cl.
*H01R 12/70* (2011.01)
*H01R 13/08* (2006.01)
(Continued)

(52) U.S. Cl.
CPC ........... *H01R 12/707* (2013.01); *H01R 13/08* (2013.01); *H01R 13/2471* (2013.01); *H01R 13/405* (2013.01); *H01R 13/502* (2013.01)

(58) Field of Classification Search
CPC .. H01R 12/707; H01R 13/08; H01R 13/2471; H01R 13/405; H01R 13/502; H01R 12/58; H01R 4/2406; H01R 12/75; H01R 12/718
See application file for complete search history.

(56) References Cited

U.S. PATENT DOCUMENTS 7,445,488 B2 * 11/2008 Feldmeier ............ H01R 4/2406 439/425
11,631,944 B2 * 4/2023 Lybrand ................. H01R 4/245 439/394
(Continued)

FOREIGN PATENT DOCUMENTS

CN 205319370 6/2016
CN 205319370 U * 6/2016
(Continued)

OTHER PUBLICATIONS

International Search Report and Written Opinion on PCT PCT/US2023/030547 Dtd Dec. 7, 2023.

*Primary Examiner* — Abdullah A Riyami
*Assistant Examiner* — Nader J Alhawamdeh
(74) *Attorney, Agent, or Firm* — Foley & Lardner LLP

(57) ABSTRACT

An electrical contact includes a base portion extending from a first end of the contact to a second end of the contact, a first set of outer walls extending upward from the base portion, the first set of outer walls being disposed on a first side. The electrical contact also includes a second set of outer walls extending upward from the base portion, the second set of outer walls being disposed on a second side opposite the first set of outer walls and the first side. The electrical contact also includes a piercing member disposed between the first set of outer walls and the second set of outer walls, the piercing member extending upward in a direction substantially parallel to at least one wall within the first set of outer walls and the second set of outer walls, the piercing member configured to pierce an insulated wire.

20 Claims, 3 Drawing Sheets

(51) Int. Cl.

| | |
|---|---|
| ***H01R 13/24*** | (2006.01) |
| ***H01R 13/405*** | (2006.01) |
| ***H01R 13/502*** | (2006.01) |

(56) References Cited

U.S. PATENT DOCUMENTS

| | | | | |
|---|---|---|---|---|
| 2018/0277984 | A1* | 9/2018 | Hata | H01R 4/2433 |
| 2020/0006869 | A1* | 1/2020 | Newman | H02G 15/113 |
| 2020/0144735 | A1* | 5/2020 | Hata | H01R 4/2425 |
| 2020/0266554 | A1* | 8/2020 | Johnson | H01R 4/44 |
| 2022/0255247 | A1* | 8/2022 | Lybrand | H01R 9/223 |
| 2024/0079805 | A1* | 3/2024 | Lybrand | H01R 13/502 |

FOREIGN PATENT DOCUMENTS

| | | | |
|---|---|---|---|
| CN | 206379507 | | 8/2017 |
| JP | 2012-015114 | A | 1/2012 |
| KR | 10-2022-0006202 | | 1/2022 |
| WO | WO-86/07200 | A1 | 12/1986 |

* cited by examiner

INSULATING PIERCING CONTACT WITH WIRE RETENTION FEATURE

CROSS-REFERENCE TO RELATED APPLICATIONS

The present application claims priority to U.S. Provisional Patent Application No. 63/401,902, filed Aug. 29, 2022, the contents of which are incorporated by reference herein in their entirety.

FIELD

The present disclosure relates generally to the field of electrical connectors, and more particularly to a type of connector used to form electrical connections with wire bundles.

BACKGROUND

Various connectors are used to form electrical connections between a wire and any manner of electronic or electrical component. These connectors may be sockets, plugs, or shrouded headers available in a vast range of sizes, pitches, and plating options. Often, forming connections with insulated wire can be challenging due to difficulty piercing or cutting the wire bundle insulation or due to complicated connector structure. Accordingly, it would be advantageous to provide a quick, efficient, and reliable means of forming electrical connections with insulated wire bundles.

SUMMARY

One aspect of the present disclosure relates to an electrical contact. The electrical contact includes a base portion extending from a first end of the contact to a second end of the contact. The electrical contact also includes a first set of outer walls extending upward from the base portion, where the first set of outer walls is disposed on a first side. The contact also includes a second set of outer walls extending upward from the base portion, where the second set of outer walls is disposed on a second side opposite the first set of outer walls and the first side. The electrical contact further includes a piercing member disposed between the first set of outer walls and the second set of outer walls, where the piercing member extends upward in a direction substantially parallel to at least one wall within the first set of outer walls and the second set of outer walls, and where the piercing member is configured to pierce an insulated wire.

In various embodiments, the electrical contact also includes a side wall disposed between the first set of outer walls and the second set of outer walls, where the piercing member is formed within the side wall. In some embodiments, the side wall has a shape that is complementary to a shape of the insulated wire. In other embodiments, each of the first set of outer walls and the second set of outer walls include two walls, where a first wall of each of the at least one first outer wall and the at least one second outer wall is disposed at the first end and a second wall of each of the at least one first outer wall and the at least one second outer wall is disposed at the second end. In yet other embodiments, the first set of outer walls, the second set of outer walls, and the at least one side wall form a passage. In various embodiments, the at least one piercing member is a blade. In some embodiments, each wall within each of the first set of outer walls and the second set of outer walls includes a protrusion disposed at a terminal upper end. In some embodiments, each of the first set of outer walls and the second set of outer walls is integrally formed with the base portion.

Another aspect of the present disclosure relates to an electrical contact assembly. The electrical contact assembly includes an electrical contact. The electrical contact includes a base portion and a first set of outer walls extending upward from the base portion, where the first set of outer walls is disposed on a first side. The electrical contact also includes a second set of outer walls extending upward from the base portion, where the second set of outer walls is disposed on a second side opposite the first set of outer walls and the first side, and where the first set of outer walls and the second set of outer walls form a passage therebetween; The electrical contact also includes a piercing member disposed between the first set of outer walls and the second set of outer walls, where the piercing member extends in a direction substantially parallel to at least one wall within the first set of outer walls and the second set of outer walls. The electrical contact further includes a plurality of solder tails extending downward from the base portion. The electrical contact assembly further includes a printed circuit board (PCB), where the PCB is configured to receive the electrical contact, and where the plurality of solder tails are structured to be received within corresponding connection ports within the PCB.

In various embodiments, the plurality of solder tails includes two pairs of solder tails, where a first pair of the two pairs of solder tails is disposed at a first end of the electrical contact and a second pair of the two pairs of solder tails is disposed at a second end of the electrical contact. In some embodiments, the electrical contact further includes a support base extending form the base portion, where the support base is disposed between each of the first pair and the second pair of the two pairs of solder tails. In other embodiments, the base portion is structured to abut the PCB. In yet other embodiments, the electrical contact further includes a side wall disposed between the first set of outer walls and the second set of outer walls, where the piercing member is formed within the side wall. In various embodiments, each of the first set of outer walls and the second set of outer walls includes two walls, where a first wall of each of the first set of outer walls and the second set of outer walls is disposed at a first end of the electrical contact and a second wall of each of the first set of outer walls and the second set of outer walls is disposed at a second end of the electrical contact.

Yet another aspect of the present disclosure relates to a method of forming an electrical connection with an insulated wire. The method includes forming a portion of sheet metal to have a shape corresponding to an electrical contact and soldering the electrical contact to a PCB. The electrical contact includes a base portion and a first set of outer walls extending upward from the base portion, where the first set of outer walls is disposed on a first side. The electrical contact also includes a second set of outer walls extends upward from the base portion, where the second set of outer walls is disposed on a second side opposite the first set of outer walls and the first side, and where the first set of outer walls and the second set of outer walls form a passage therebetween. The electrical contact also includes a piercing member disposed between the first set of outer walls and the second set of outer walls, where the piercing member extends in a direction substantially parallel to at least one wall within the first set of outer walls and the second set of outer walls.

In various implementations, the method also includes cutting the portion of sheet metal. In some implementations, the electrical contact further includes a pair of solder tails extending downward from the base portion. In other implementations, the method further includes inserting the pair of solder tails into corresponding connection ports disposed within the PCB. In various implementations, the method also includes forming the portion of sheet metal to have a shape corresponding to the electrical contact comprises bending the sheet metal. In yet other embodiments, the method also includes providing the insulated wire, aligning the insulated wire with the passage, and piercing the insulated wire with the at least one piercing member by pressing the insulated wire into the passage.

This summary is illustrative only and should not be regarded as limiting.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Typical connectors for forming electrical connections with insulated wire bundles can be cumbersome or ineffective due to challenges with penetrating or stripping the insulation, or because the contact itself may require multiple components. For example, some connector types require secondary housings to position the insulated wire bundles so a primary component forms the electrical connection with the wire bundle.

The present disclosure is directed to an insulation piercing contact that is structured to retain the wire bundle within the contact to facilitate a secure electrical connection between the contact and the wire bundle. By both facilitating electrical connection with the wire and retaining the wire, the contact described herein reduces a number of components necessary to enable secure connections with an insulated wire bundle. Furthermore, by reducing the number of components necessarily reduces a number of necessary assembly steps required to enable electrical connection with an insulated wire bundle.

Figure 1:
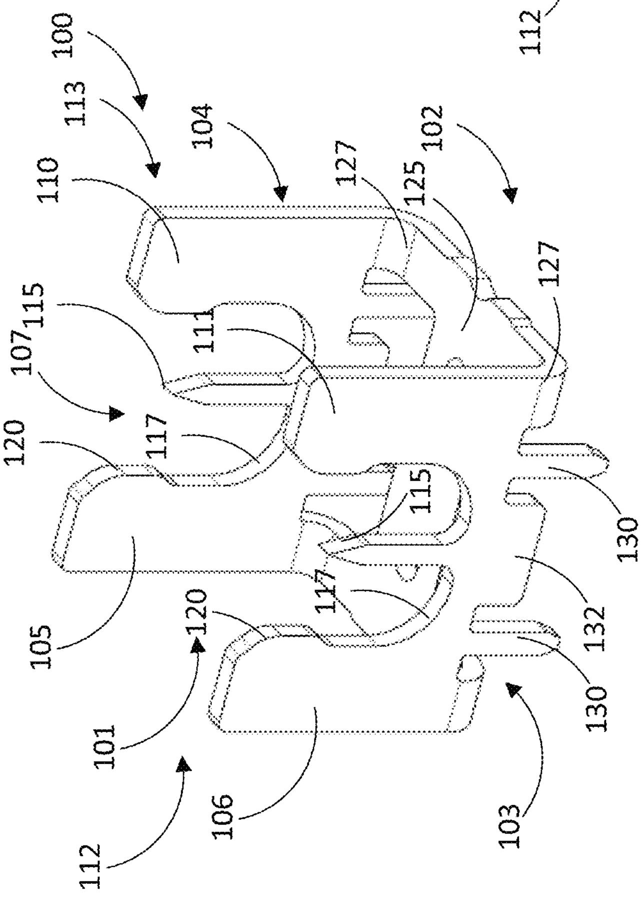
FIG. 1 is a perspective view of a piercing contact, according to an exemplary embodiment.

Referring to FIG. 1, a contact 100 is shown, according to an exemplary embodiment. The contact 100 may be structured for connection to a printed circuit board (PCB) or other component configured to facilitate electrical connection. As shown, the contact 100 includes a first set of outer walls 112 disposed on a first side 101 of the contact 100 and a second set of outer walls 113 disposed on a second side 102 of the contact 100. In various embodiments, the first set of outer walls 112 and the second set of outer walls 113 are arranged in an opposing arrangement such that the first set of outer wall 112 and the second set of outer walls 113 are in a mirrored configuration. As shown in FIG. 1, the first set of outer walls 112 can include a first wall 105 and a second wall 106, and the second set of outer walls 113 can include a third wall 110 and a fourth wall 111. As shown, the first set of outer walls 112 and the second set of outer walls 113 are structured such that the second wall 106 and the fourth wall 111 are disposed at or near a first end 103 of the contact 100 and the first wall 105 and the third wall 110 are disposed at or near a second end 104 of the contact 110. In various embodiments, each of the first and second sets of outer walls 112, 113 may include two walls, as shown in FIG. 1. In some embodiments, the first and second sets of outer walls 112, 113 may each include any number of walls (e.g., 1, 2, 3, 5, 8, etc.), which may be similar or equivalent to the walls 105, 106, 110, 111. In various embodiments, the first and second walls 105, 106 may be formed as a single wall, extending between the first end 103 and the second end 104 of the contact 100. Additionally or alternatively, the third and fourth walls 110, 111 may be formed as a single wall, extending between the first end 103 and the second end 104 of the contact.

The first set of outer walls 112 and the second set of outer walls 113 are arranged in an opposing or mirrored configuration such that they form a passage 107. The passage 107 may be defined at each of the first end 103 and the second end 104 by a side wall 117, which connects between the first set of outer walls 112 and the second set of outer walls 113. The passage 107 may have a shape that is substantially complementary to a shape of a wire bundle. For example, as shown, the passage 107 may have a cylindrical shape so as to receive a cylindrically shaped wire. In other embodiments, the passage 107 may be rectangular or oblong in shape so as to receive a wire that is rectangular or oblong in shape. As shown in FIG. 1, in embodiments where each of the first and second sets of outer walls 112, 113 includes two walls, and where the second wall 106 and the fourth wall 111 are disposed at the first end 103 and the first wall 105 and the third wall 110 are disposed at the second end 104, the second wall 106 and the fourth wall 111 are connected by a first side wall 117 at the first end 103 and first wall 105 and the third wall 110 are connected by a second side wall 117 at the second end 104. The first and second side walls 117 may have a shape that is complementary to a shape of a wire bundle. For example, as shown, the first and second side walls 117 may have an arcuate shape such that the passage 107 is generally cylindrical in shape.

Each side wall 117 includes at least one piercing member 115, which extends upward from the side wall 117 and is structured to pierce a wire bundle placed upon the contact 100. In various embodiments, the at least one piercing member 115 may extend upward from the side wall 117 in a direction that is substantially parallel with at least one wall of the first or second sets of outer walls 112, 113. In various embodiments, the at least one piercing member 115 is a blade. In other embodiments, the at least one piercing member 115 is a needle. In yet other embodiments, the at least one piercing member 115 is structured to have a substantially rectangular cross-section within a first portion and a sharpened, substantially triangular second portion that forms a tip. As shown in FIG. 1, the contact 100 may include two piercing members 115, where a first piercing member 115 is disposed within the side wall 117 at the first end 103 and a second piercing member 115 is disposed within the side wall 117 at the second end 104.

As shown in FIG. 1, one or more walls (i.e., one or more of the first wall 105, second wall 106, third wall 110, and fourth wall 111) within the first and second sets of outer walls 112, 113 may include one or more protrusions 120 disposed at or near a terminal upper end of each of the wall. For example, as shown in FIG. 1, each of the first wall 105, second wall 106, third wall 110, and fourth wall 111 includes a ridge 120 disposed near the terminal upper end of each wall such that a width of the passage 107 is smaller between the terminal upper ends of each wall as compared to a width of the passage 107 nearer to a base of each wall. In various embodiments, the one or more protrusions 120 may be a ridge, a knob, a bump, or any other similar feature. In some embodiments, each of the first wall 105, second wall 106, third wall 110, and fourth wall 111 may be structured such that a width of each wall increases in width near the terminal upper end of each outer wall such that each wall forms a protrusion 120.

As shown in FIG. 1, the first and second walls 105, 106, and the third and fourth walls 110, 111 may be separated by a base portion 125 of the contact 110. The base portion 125 may be substantially horizontal such that the first and second sets of outer walls 112, 113 extend upward from the base portion 125 in a substantially perpendicular direction. In various embodiments, the base portion 125 is integrally formed with each of the first and second sets of walls 112, 113 (i.e., and thus integrally formed with each of the first wall 105, second wall 106, third wall 110, and fourth wall 111) at each of the first and second ends 103, 104 via joints 127. As shown in FIG. 1, each of the first and second ends 103, 104 may also include a pair of solder tails 130, which extend downward from the base portion 125 in a direction that is substantially perpendicular thereto. Each of the solder tails 130 is configured to be inserted within and soldered to a corresponding region (e.g., aperture, port, etc.) within a PCB. In various embodiments, each pair of solder tails 130 extends in a direction that is substantially parallel to at least one wall within the first and second sets of outer walls 112, 113. In various embodiments, each pair of solder tails 130 is separated by a support base 132, which is structured to support the at least one piercing member 115 against a termination force acting on the at least one piercing member 115 during piercing of a wire bundle placed upon the contact 100. In various embodiments, the contact 100 (and thus the at least one piercing member 115) is made of material having a large bend radius to prevent cracking during formation of the contact 100. Accordingly, the support base 132 placement beneath the at least one piercing member 115 is structured to resist torque and prevent outward deflection of the at least one piercing member 115. In embodiments where the contact 100 may be formed from a material having a lower bend radius or in applications where little to no bending moments are present, the contact 100 may be formed without a support base 132. The support base 132 may be structured to abut a portion of a PCB coupled to the contact 100. In other embodiments, the support base 132 may be received within a recess or aperture disposed within a PCB coupled to the contact 100. In yet other embodiments, the support base 132 is substantially rectangular in shape and extends downward from the base portion 125 in a direction substantially parallel with the solder tails and perpendicular to the base portion 125. In some embodiments, the contact 100 may be formed to include only the end 103, having the second and fourth walls 106, 111 (or alternatively only the first and third walls 105, 110), a single sidewall 117, a single piercing member 115 disposed within the sidewall 115, a single pair of solder tails 130, and a support base 132. The single-ended contact 100 may still include ridges 120 to retain a wire disposed thereon.

Figure 2:
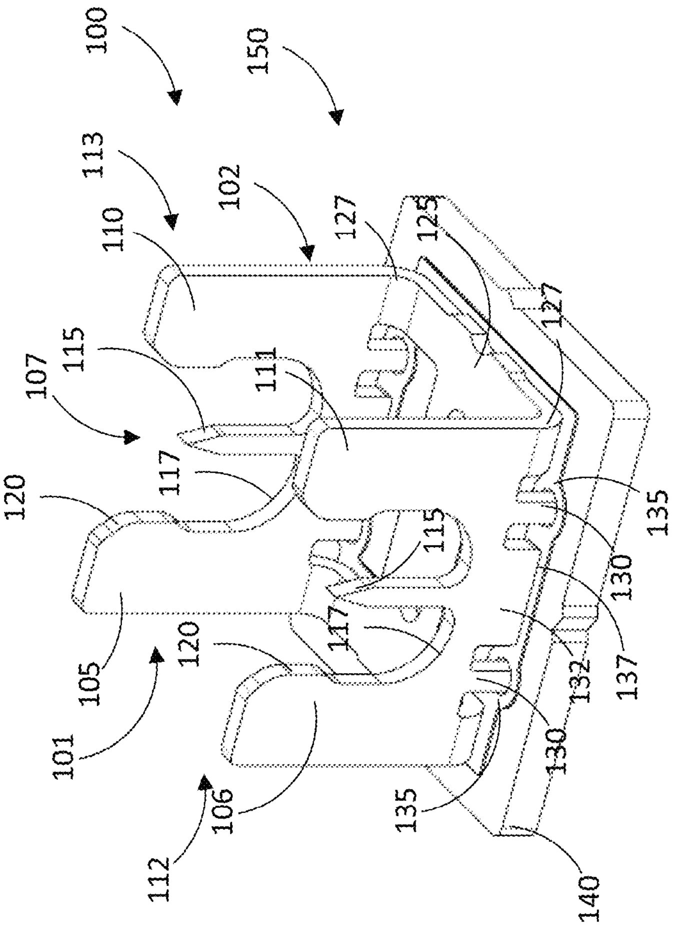
FIG. 2 is a perspective view of a contact assembly, which includes the piercing contact of FIG. 1 coupled to a printed circuit board (PCB), according to an exemplary embodiment.

FIG. 2 shows a perspective view of the contact 100 coupled to a PCB 140 to form a contact assembly 150, according to an exemplary embodiment. As shown, the contact 100 may be arranged on the PCB 140 such that the base portion 125 rests on a contact region within the PCB 140. Each of the solder tails 130 disposed at each of the ends 103, 104 of the contact 100 are received within connection ports 135. As shown, the support base 132 may abut a region 137 disposed between the connection ports 135.

Figure 4:
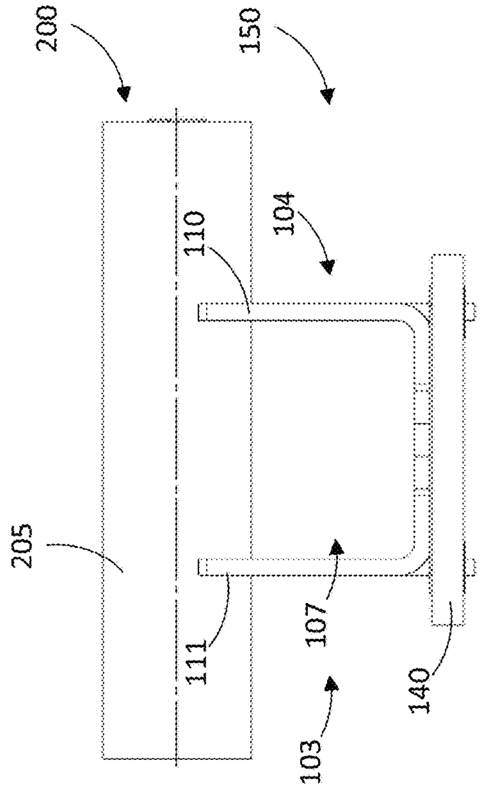
FIG. 4 is a side view of the wire bundle of FIG. 3 in the unengaged position relative to the contact assembly of FIG. 2, according to an exemplary embodiment.
Figure 5:
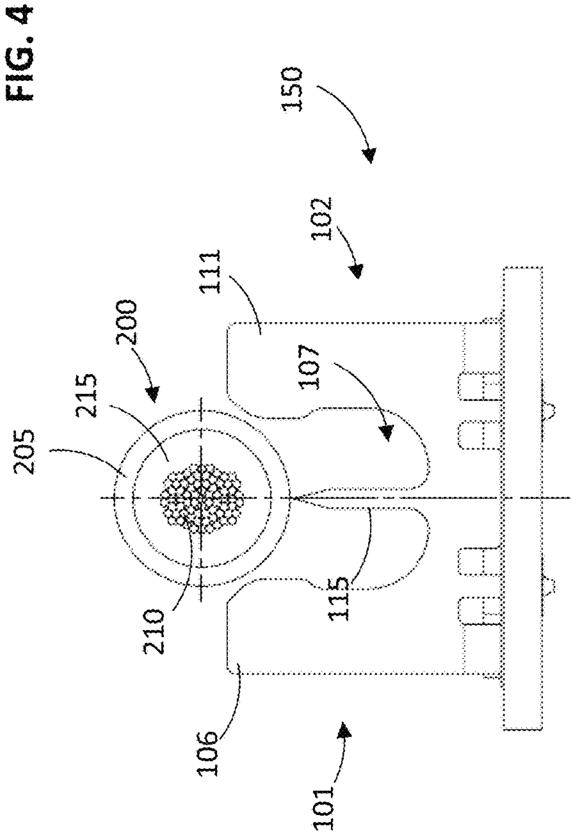
FIG. 5 is an end view of the wire bundle of FIG. 3 in the unengaged position relative to the contact assembly of FIG. 2, according to an exemplary embodiment.
Figure 3:
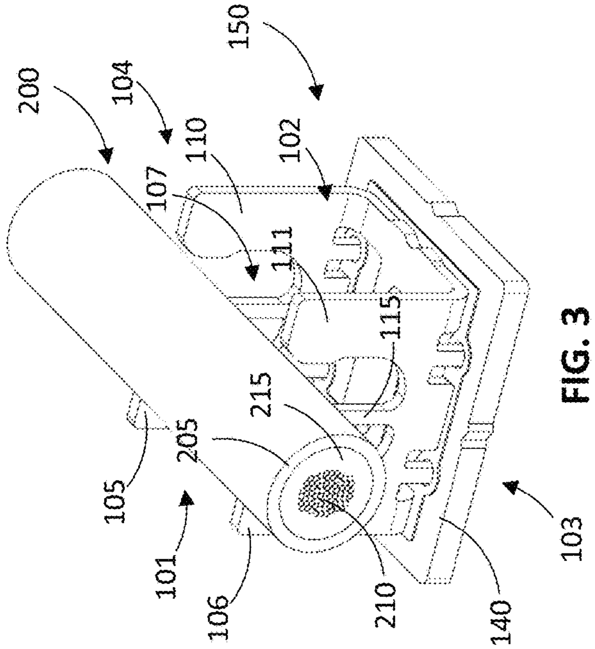
FIG. 3 is a perspective view of a wire bundle in an unengaged position relative to the contact assembly of FIG. 2, according to an exemplary embodiment.

To facilitate electrical connection, the contact assembly 140 is configured to receive a wire 200, as shown in FIG. 3-5. The wire 200 may include a wire bundle 210, which is insulated via an outer case 205 and an insulation layer 215. In various embodiments, the outer case 205 is an insulative layer. In various embodiments, the wire 200 may be structured to have a single insulative layer. For example, the wire may have an outer case 205 only or an insulation layer 215 only. In other embodiments, the wire 200 may have any number of insulative layers (e.g., 3, 5, 7, etc.). In various embodiments, a number of insulative layers of the wire 200 may be based on a use application or a use environment of the wire 200 (e.g., harsh environment). To form an electrical connection between the contact assembly 140 (and thus the contact 100), the wire 200 may be positioned above the contact 100 such that a bottom surface of the outer casing 205 of the wire 200 is aligned with the passage 107, as shown in FIG. 3. As illustrated in FIGS. 4 and 5, prior to engagement with the contact 100, the wire 200 may be moved downward onto the contact 100 such that the bottom surface of the outer casing 205 is positioned above the at least one piercing member 115. In various embodiments, such as shown in FIG. 3, the wire 200 may be positioned above two piercing members 115 such that the wire 200 may be pierced in two locations.

Figure 7:
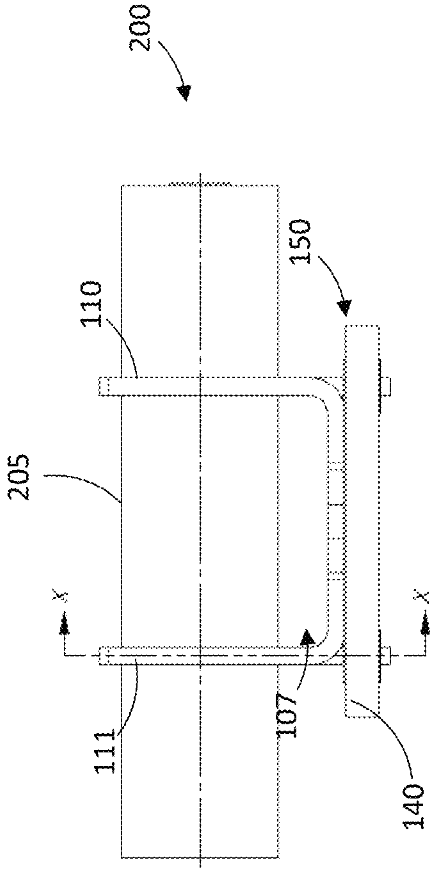
FIG. 7 is a side view of the wire bundle of FIG. 3 in the engaged position relative to the contact assembly of FIG. 2, according to an exemplary embodiment.
Figure 8:
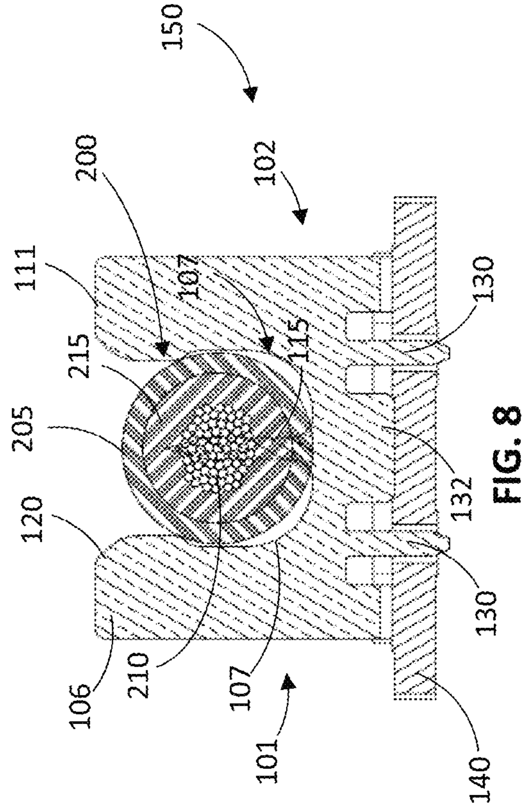
FIG. 8 is a cross-sectional view taken along line X-X of FIG. 7, illustrating the wire bundle of FIG. 3 in an engaged position relative to the contact assembly of FIG. 2, according to an exemplary embodiment.
Figure 6:
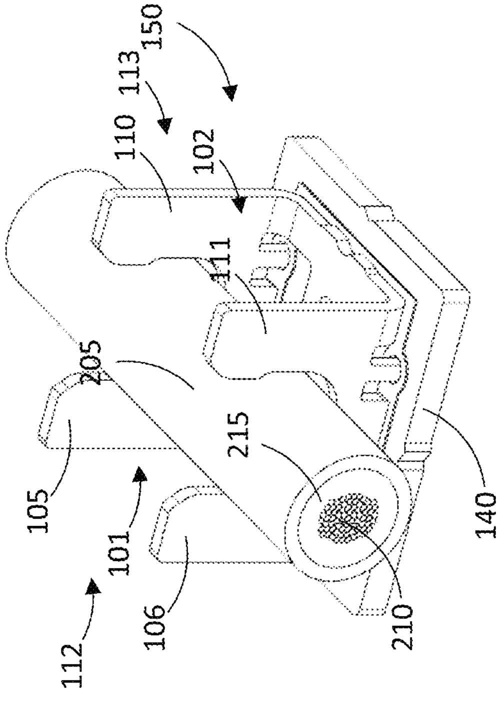
FIG. 6 is a perspective view of the wire bundle of FIG. 3 in an engaged position relative to the contact assembly of FIG. 2, according to an exemplary embodiment.

To complete electrical connection between the contact assembly 140 and the wire 200, the wire 200 may be pressed downward into the passage 107, as shown in FIGS. 6-8. As shown, the wire 200 is pressed into the passage 107 such that the at least one piercing member 115 (which may include two piercing members 115) pierce the casing 205, extend through the insulation 215, and engage with the wire bundle 210 to form an electrical connection between the contact 100 and the wire 200. The wire 200 position is retained via the first and second sets of outer walls 112, 113. The electrical connection between the wire 200 and the contact 100 is retained via the protrusions 120, which may form an interference fit with the wire 200 to prevent the wire from being displaced upward away from the at least one piercing member 115. For example, as shown in FIGS. 6-8, the wire 200 is positioned such that the first and second walls 105, 106 are on a first side of the wire 200 and the third and fourth walls 110, 111 are on a second, opposite side of the wire 200. Accordingly, the wire 200 is retained on the contact 100 via the protrusions 120 of each of the first wall 105, second wall 106, third wall 110, and fourth wall 111. In this manner, the contact 100 may reduce a number of necessary parts for facilitating both electrical connection and retention of the wire 200. Furthermore, the first and second sets of outer walls 112, 113 may provide stability to the wire 200 by minimizing risk of the wire 200 twisting, sliding, or otherwise moving relative to the contact 110.

In various embodiments, the contact 100 may be fabricated as a single part. In various embodiments, the contact 100 may be fabricated at a manufacturing facility having one or more components configured to receive, process, cut (or stamp), and roll sheet metal. In some embodiments, the one or more components may include at least one controller. The controller may be configured to include a processor and a non-transitory computer readable medium (e.g., a memory device) having computer-readable instructions stored thereon that, when executed by the processor, cause the at least one controller to carry out one or more operations. In various embodiments, the at least one controller is a computing device (e.g., a microcomputer, microcontroller, or microprocessor). In other embodiments, the at least one controller is configured as part of a data cloud computing system configured to receive commands from a user control device and/or remote computing device. In some implementations, sheet metal may be cut or stamped (i.e., by the one or more components) to have a shape corresponding to the contact 100. The cut or stamped piece of sheet metal may then be bent, rolled, or otherwise formed (by the one or more components) to have a structure corresponding to the contact 100. For example, a portion of sheet metal (i.e., that has been cut or stamped) may be bent such that the first and second sets of outer walls 112, 113 extend upward away from the base portion 125 and the solder tails 130 extend downward away from the base portion 125. Once the contact 100 is formed, the contact 100 may be placed onto the PCB 140 such that the solder tails 130 are received within the connection ports 135 and the support base 132 abuts a region 137 between the connection ports 135. The solder tails 130 may then be soldered to the PCB 140 to form the contact assembly 150.

Once the contact assembly 150 is formed, the wire 200 may be positioned above the contact 100 such that it is aligned with the passage 107 and disposed above the at least one piercing member 115. The wire 200 may then be pressed on to the at least one piercing member 115 such that the at least one piercing member pierces the casing 205, the insulation 215, and extends into the wire bundle 210 to form an electrical connection therewith. The resultant electrical connection between the contact 100 (and the contact assembly 140) is maintained via the protrusions 120, which may prevent separation of the wire 200 from the at least one piercing member 115 and movement of the wire 200 out of the passage 107. In some embodiments, when the wire 200 is engaged with the contact 100 (i.e., when the at least one piercing member 115 has pierced the wire 200 such that it contacts the wire bundle 210), the bottom surface of the casing 205 of the wire 200 abuts or is in contact with the at least one side wall 117.

Notwithstanding the embodiments described above in reference to FIGS. 1-8, various modifications and inclusions to those embodiments are contemplated and considered within the scope of the present disclosure.

As utilized herein with respect to numerical ranges, the terms “approximately,” “about,” “substantially,” and similar terms generally mean+/−10% of the disclosed values, unless specified otherwise. As utilized herein with respect to structural features (e.g., to describe shape, size, orientation, direction, relative position, etc.), the terms “approximately,” “about,” “substantially,” and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term “exemplary” and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term “coupled” and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If “coupled” or variations thereof are modified by an additional term (e.g., directly coupled), the generic definition of “coupled” provided above is modified by the plain language meaning of the additional term (e.g., “directly coupled” means the joining of two members without any separate intervening member), resulting in a narrower definition than the generic definition of “coupled” provided above. Such coupling may be mechanical, electrical, or fluidic.

References herein to the positions of elements (e.g., “top,” “bottom,” “above,” “below”) are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above.

It is important to note that any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. An electrical contact comprising:

a base portion extending from a first end of the electrical contact to a second end of the electrical contact;

a first outer wall extending upward from the base portion, the first outer wall being disposed on the first end;

a second outer wall extending upward from the base portion, the second outer wall being disposed on the first end;

a first side wall connecting between the first outer wall and the second outer wall; and a first piercing member disposed between the first outer wall and the second outer wall, the first piercing member extending upward from the first side wall in a direction substantially parallel to at least one of the first outer wall and the second outer wall, the first piercing member configured to pierce an insulated wire.

2. The electrical contact of claim 1, wherein the first piercing member is formed within the first side wall.

3. The electrical contact of claim 1, wherein the first side wall has a shape that is complementary to a shape of the insulated wire.

4. The electrical contact of claim 1, wherein the first set of outer wall, the second outer wall, and the first side wall form a passage.

5. The electrical contact of claim 1, wherein the first piercing member is a blade.

6. The electrical contact of claim 1, wherein each of the first outer wall and the second outer wall comprises a protrusion disposed at a terminal upper end.

7. The electrical contact of claim 1, wherein each of the first outer wall and the second outer wall is integrally formed with the base portion.

8. The electrical contact of claim 1, further comprising:

a third outer wall extending upward from the base portion, the third outer wall being disposed on a second side;

a fourth outer wall extending upward from the base portion, the fourth outer wall being disposed on the second side;

a second side wall connecting between the third outer wall and the fourth outer wall; and a second piercing member disposed between the third outer wall and the fourth outer wall, the second piercing member extending upward from the second side wall in a direction substantially parallel to at least one of the third outer wall and the fourth outer wall, the second piercing member configured to pierce the insulated wire.

9. An electrical contact assembly comprising:

an electrical contact comprising:

a base portion;

a first outer wall extending upward from the base portion, the first outer wall being disposed on a first end;

a second outer wall extending upward from the base portion, the second outer wall being disposed on the first end;

wherein the first outer wall and the second outer wall form a passage therebetween;

a first side wall connecting between the first outer wall and the second outer wall;

a first piercing member disposed between the first outer wall and the second outer wall, the first piercing member extending in a direction substantially parallel to at least one of the first outer wall and the second outer wall; and a plurality of solder tails extending downward from the base portion; and a printed circuit board (PCB), the PCB configured to receive the electrical contact;

wherein the plurality of solder tails are structured to be received within corresponding connection ports within the PCB.

10. The electrical contact assembly of claim 9, wherein the plurality of solder tails comprises two pairs of solder tails, and wherein a first pair of the two pairs of solder tails is disposed at the first end of the electrical contact and a second pair of the two pairs of solder tails is disposed at a second end of the electrical contact.

11. The electrical contact assembly of claim 10, wherein the electrical contact further comprises a support base extending from the base portion, the support base being disposed between each of the first pair and the second pair of the two pairs of solder tails.

12. The electrical contact assembly of claim 11, wherein the base portion is structured to abut the PCB.

13. The electrical contact assembly of claim 9, wherein the first piercing member is formed within the first side wall.

14. The electrical contact assembly of claim 9, wherein the electrical contact further comprises:

a third outer wall extending upward from the base portion, the third outer wall being disposed on a second side;

a fourth outer wall extending upward from the base portion, the fourth outer wall being disposed on the second side;

a second side wall connecting between the third outer wall and the fourth outer wall; and a second piercing member disposed between the third outer wall and the fourth outer wall, the second piercing member extending in a direction substantially parallel to at least one of the third outer wall and the fourth outer wall.

15. A method of forming an electrical connection with an insulated wire, the method comprising:

forming a portion of sheet metal to have a shape corresponding to an electrical contact; and soldering the electrical contact to a PCB;

wherein the electrical contact comprises:

a base portion;

a first outer wall extending upward from the base portion, the first outer wall being disposed on a first end;

a second outer wall extending upward from the base portion, the second outer wall being disposed on the first end;

wherein the first outer wall and the second outer wall form a passage therebetween;

a first side wall connecting between the first outer wall and the second outer wall; and a first piercing member disposed between the first set of outer wall and the second set of outer wall, the first piercing member extending in a direction substantially parallel to at least one of the first outer wall and the second outer wall.

16. The method of claim 15, further comprising cutting the portion of sheet metal.

17. The method of claim 15, wherein the electrical contact further comprises a pair of solder tails extending downward from the base portion.

18. The method of claim 17, further comprising inserting the pair of solder tails into corresponding connection ports disposed within the PCB.

19. The method of claim 15, wherein forming the portion of sheet metal to have a shape corresponding to the electrical contact comprises bending the sheet metal.

20. The method of claim 15, further comprising:

providing the insulated wire;

aligning the insulated wire with the passage; and piercing the insulated wire with the first piercing member by pressing the insulated wire into the passage.

* * * * *